(12) United States Patent
Chinomi et al.

(10) Patent No.: US 7,592,928 B2
(45) Date of Patent: Sep. 22, 2009

(54) IMAGE DISPLAY DEVICE AND METHOD

(75) Inventors: Satoshi Chinomi, Yokohama (JP); Teruhisa Takano, Kawasaki (JP); Ken Oizumi, Kawasaki (JP); Takura Yanagi, Yokohama (JP); Tsutomu Kawano, Yokohama (JP); Hidenori Seguchi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 134 days.

(21) Appl. No.: 11/447,435

(22) Filed: Jun. 6, 2006

(65) Prior Publication Data

US 2006/0274147 A1 Dec. 7, 2006

(30) Foreign Application Priority Data

Jun. 7, 2005 (JP) ............................. 2005-166865

(51) Int. Cl.
*B60Q 1/48* (2006.01)
(52) U.S. Cl. ..................................... 340/932.2; 340/436
(58) Field of Classification Search ............. 340/932.2, 340/435, 436, 932.3; 348/143–170
See application file for complete search history.

(56) References Cited

U.S. PATENT DOCUMENTS 5,949,331 A 9/1999 Schofield et al.
7,161,616 B1 * 1/2007 Okamoto et al. ............ 348/148

2003/0063774 A1 4/2003 Oizumi
2003/0179293 A1 9/2003 Oizumi

FOREIGN PATENT DOCUMENTS

| EP | 1 179 958 A1 | 2/2002 |
|---|---|---|
| EP | 1 231 110 A2 | 8/2002 |
| JP | 2001-339716 | 12/2001 |
| JP | 2003-111074 | 4/2003 |
| JP | 2003-281505 | 10/2003 |
| JP | 2004-048621 | 2/2004 |
| JP | 2004-064441 | 2/2004 |
| JP | 2004-254219 | 9/2004 |
| US | 2002/0145663 A1 | 10/2002 |

OTHER PUBLICATIONS

European Patent Application No. 06252939.1 Search Report dated Oct. 5, 2006.

* cited by examiner

*Primary Examiner*—Daniel Wu
*Assistant Examiner*—Shirley Lu
(74) *Attorney, Agent, or Firm*—Young Basile (57) ABSTRACT

A device and method that allows any differences between the relative position of an obstacle as it appears in a bird's-eye view image and its actual relative position can be checked on the same screen. In order to display the vehicle surroundings to the driver, multiple direct images obtained from multiple pickup devices, preferably cameras, oriented in different directions are used to compose a bird's-eye view image from which the vehicle surroundings can be known at a glance. The bird's-eye view image and a direct image picked up in the direction of an obstacle with respect to the vehicle are simultaneously displayed when the obstacle is detected in the vicinity of the vehicle.

21 Claims, 6 Drawing Sheets

IMAGE DISPLAY DEVICE AND METHOD

TECHNICAL FIELD

The invention relates in general to an image display device and method for displaying images of the vehicle surroundings to the driver during, for example, the parking of the vehicle.

BACKGROUND

Conventional technology discloses a method for processing multiple camera images of vehicle surroundings for display to the driver as described in, for example, FIG. 7 of Japanese Kokai Patent Application No. 2004-254219. The vehicle surrounding image-processing device described in that reference provides an image (a bird's-eye view image hereafter) from pickup devices mounted on the vehicle by converting one or more camera images into an image as if picked up from an imaginary overhead viewing point by coordinate transformation with respect to a reference plane and superimposing a computer-generated image of the vehicle prepared beforehand with computer-generated technology on the images. During the preparation of such a bird's-eye view image, the ground surface is often used as the reference plane. Since the positional relationship between the white line, the curb, etc., on the ground surface and the vehicle is expressed objectively, this bird's-eye view image is an effective aid when parking in a marked parking space or when moving the vehicle alongside a curb.

BRIEF SUMMARY OF THE INVENTION

Disclosed herein is an image display device for a vehicle comprising multiple cameras for pickup of multiple images in different directions of the vehicle surroundings, an image-processing device for composing a bird's-eye view image using the multiple images, a display device for providing the bird's-eye view image to the driver, and an obstacle detector operative to detect obstacles in the vicinity of the vehicle. The image-processing device is operable to display simultaneously on the display device the bird's-eye view image and a direct image picked up by one of the multiple cameras in the direction of an obstacle detected by the obstacle detector.

Other aspects disclose an image display device for a vehicle comprising means for capturing vehicle surroundings from a plurality of directions, means for composing a bird's-eye view image from multiple images of the vehicle surroundings so captured, means for displaying the bird's-eye view image to the driver, means for detecting a presence of any obstacles in the vicinity of the vehicle, and means for simultaneously displaying the bird's-eye view image and a direct image picked up in a direction of an obstacle when the obstacle is detected.

Also disclosed is an image display method for vehicle. The method comprises capturing vehicle surroundings with from a plurality of directions, composing a bird's-eye view image from multiple images of the vehicle surroundings so captured, displaying the bird's-eye view image to the driver, detecting a presence of any obstacles in the vicinity of the vehicle, and simultaneously displaying the bird's-eye view image and a direct image picked up in a direction of an obstacle when the obstacle is detected.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the case of synthesizing the bird's-eye view image by using the technology previously described, in theory the complete positional relationship of objects present on the reference plane is maintained, and image conversion is possible. However, there can be a problem in regard to spatial objects at a position higher or lower than the reference plane. That is, the positional relationship of the vehicle computer-generated (CG) image to the obstacles in the vicinity of the vehicle might vary.

For example, the bumper of an SUV or another vehicle with a high bumper will appear in the bird's-eye view image at a position farther than the actual position of the bumper. Thus, if the actual position of the driver's vehicle with respect to the position of another vehicle in the bird's-eye view image varies, there is the possibility that the predetermined path of the driver's vehicle that can be checked on the bird's-eye view image and the actual travel path will not be in agreement.

Thus, embodiments of the invention are proposed in light of the situation described above. It is designed to provide an image display device and method with which any differences between the relative position of an obstacle as it appears in the bird's-eye view image and the relative position of the actual obstacle can be checked on the same screen.

In order to resolve these problems and display the vehicle surroundings to the driver by using multiple unmodified direct images obtained from multiple cameras oriented in different directions with respect to the vehicle surroundings, multiple direct images are processed to compose a bird's-eye view image from which the vehicle surroundings can be made known to the driver at a glance. When an obstacle in the vicinity of the driver's vehicle is detected, the display simultaneously displays the bird's-eye view images prepared by the image-processing means and the direct images picked up in the direction of the obstacle detected by the obstacle-detection means.

Accordingly, when an obstacle in the vicinity of the driver's vehicle is detected, the display means simultaneously displays the bird's-eye view images and the direct images picked up in the direction of the obstacle with respect to the vehicle. Therefore, any differences between the relative position of the obstacle in the bird's-eye view image and the relative position of the actual obstacle can be checked on the same screen.

Additional details of embodiments are explained below with reference to the attached figures. For example, one driving support device is constructed as shown in the block diagram of FIG. 1. This driving support device has the function of an image display device that shows the vehicle surroundings to the driver by simultaneously displaying on the same screen a bird's-eye view image and images (to be called direct images hereafter) from the cameras mounted on various parts of the vehicle body and not subjected to image-processing as information used to check the position of the vehicle. It assists the driving operation by showing images required by the driver.

Figure 1:
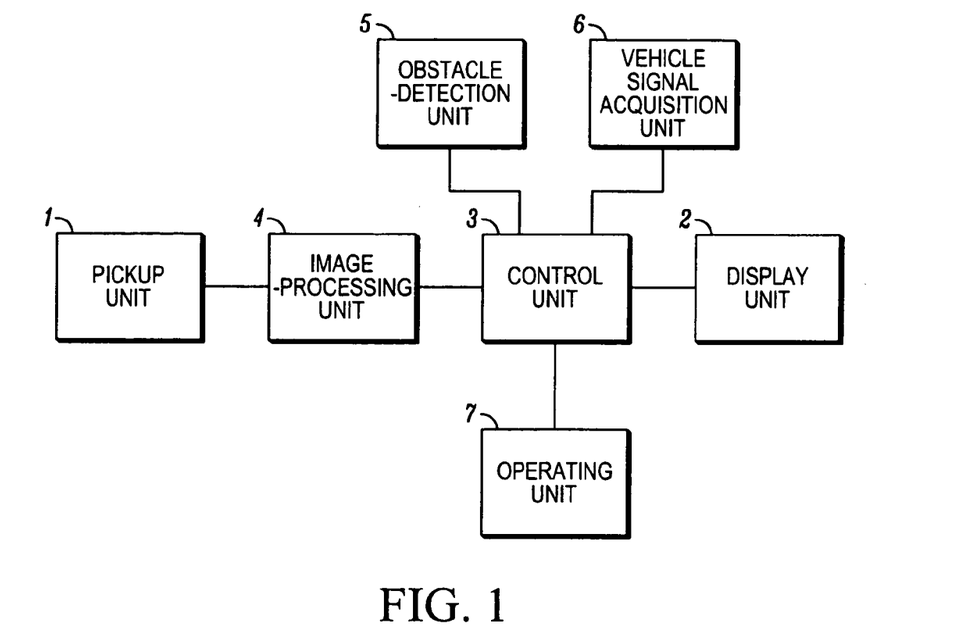
FIG. 1 is a block diagram showing one possible driving support device according to an embodiment of the present invention.

This driving support device is provided with pickup unit 1 consisting of multiple cameras mounted on the body of the vehicle and a display unit 2 provided in a position in which the display screen provided inside the vehicle can be seen by the driver. Furthermore, in this driving support device, the control unit 3 for the overall control of the image display of the multiple camera images picked up by the pickup unit 1 is connected to the image-processing unit 4, the obstacle-detection unit 5, the vehicle signal acquisition unit 6 and the operating unit 7. The control unit 3 can be, for example, a standard microprocessor coupled to memory or a standard microcontroller incorporating on-board memory, where the memory stores a control program for controlling the image display as described below. Each of these parts is discussed in more detail below.

Figure 2:
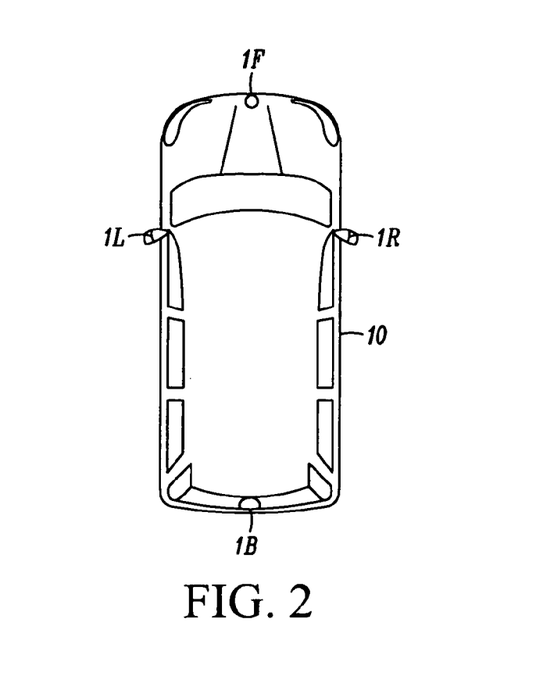
FIG. 2 is a top-view diagram showing a pickup unit.
Figure 3:
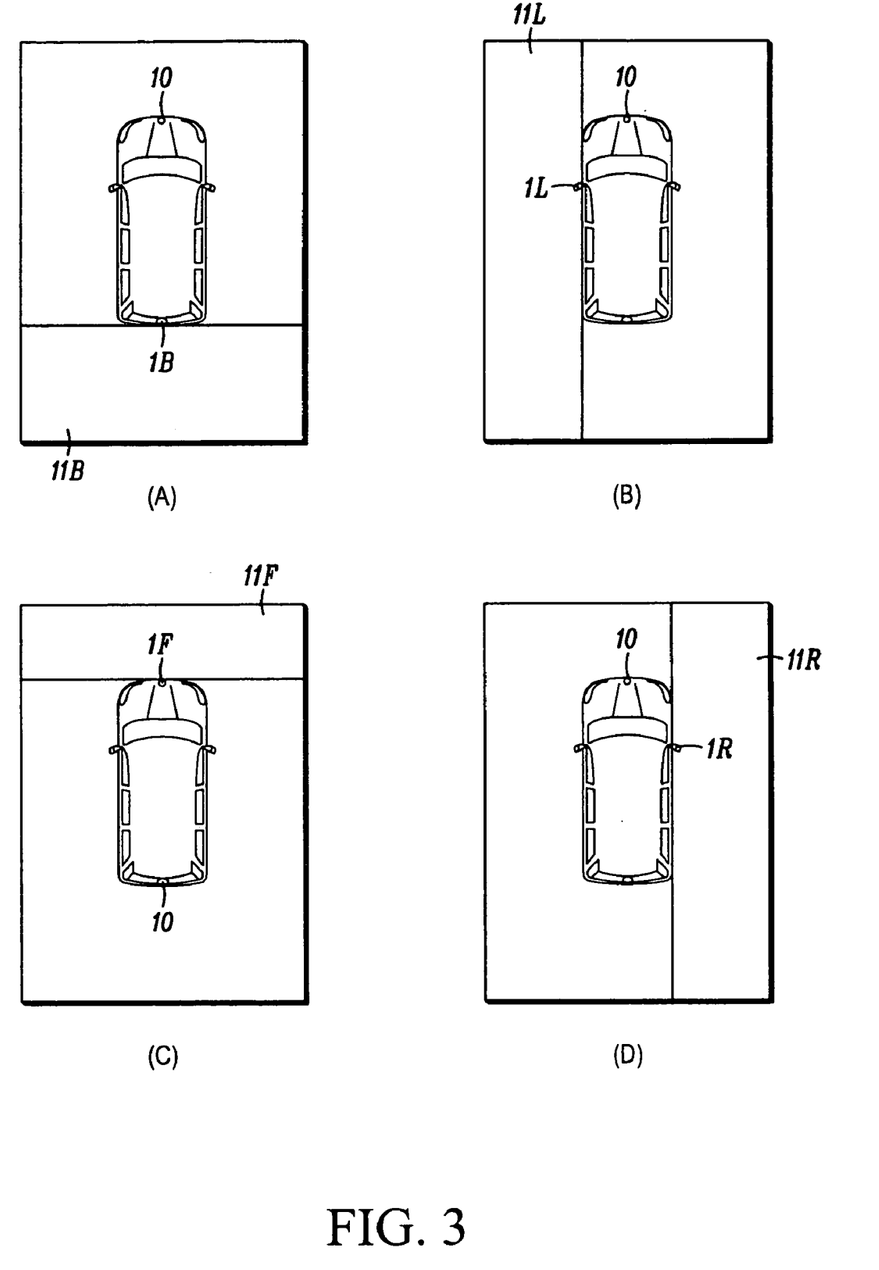
FIG. 3 is a diagram used to explain the pickup regions of the cameras where (A) is the rear pickup region, (B) is the left side pickup region, (C) is the front pickup region, and (D) is the right side pickup region.

The pickup unit 1, as shown in FIG. 2, is comprised of the front camera 1F provided in the front portion of the vehicle 10, the rear camera 1B provided in the rear of the vehicle 10, the right side camera 1R provided on the right door mirror on the right side of the vehicle 10, and the left side camera 1L provided on the left door mirror on the left side of the vehicle 10. The front camera 1F, rear camera 1B, right side camera 1R and left side camera 1L are preferably so-called wide-angle cameras and are designed with a viewing angle of 180°. Of course other cameras mounted in other positions are possible. Herein, as shown in FIG. 3, the pickup unit 1 picks up a rear direct image (A) that includes conditions in rear pickup region 11B of the vehicle 10 with the rear camera 1B, a left side direct image (B) that includes conditions in left side pickup region 11L of the vehicle 10 with the left side camera 1L, a front direct image (C) that includes conditions in front pickup region 11F of the vehicle 10 with the front camera 1F, and a right side direct image (D) that includes conditions in the right side pickup region 11R of the vehicle 10 with the right side camera 1R.

By the acquisition of the front direct image, the rear direct image, the right side direct image and the left side direct image picked up at the same time by the front camera 1F, the rear camera 1B, the right side camera 1R and the left side camera 1L, respectively, the driving support device can acquire images of all of the vehicle surroundings.

Images picked up by the pickup unit 1 and subjected to image processing for composing a bird's-eye view image (discussed in more detail below) from which all of the vehicle surroundings can be known at a glance, and the direct images, including portions of the vehicle surroundings, are input to the display unit 2. The images are displayed simultaneously corresponding to operations by the driver, obstacle-detection information in the obstacle-detection unit 5, etc.

The obstacle-detection unit 5 detects the presence or absence of an obstacle in the vehicle surroundings and its position relative to the vehicle 10 (i.e., the direction and distance with respect to the vehicle 10). The obstacle-detection unit 5 detects obstacles, for example, by using ultrasonic or infrared sensors, or by inputting the direct images obtained by the pickup unit 1 and carrying out image analysis, etc. The obstacle-detection unit 5 outputs the presence or absence of an obstacle with respect to the vehicle 10 and the obstacle-detection information including the relative position to the control unit 3.

The vehicle signal acquisition unit 6 acquires such signals as the vehicle speed, the vehicle travel direction and so on as information representing the state of the vehicle 10 and outputs them to the control unit 3. An operating unit 7, for example, the shift lever or the like, outputs the shift position information representing the operating state of the shift lever to the control unit 3.

The image-processing unit 4 acquires multiple direct images picked up by the pickup unit 1 and image processes these images to generate a bird's-eye view image from which the vehicle surroundings can be known at a glance. In regard to additional details for composing the bird's-eye view images, the reader is referred to U.S. patent application Ser. No. 11/366,091, filed Mar. 2, 2006, which is assigned to the current assignee and is incorporated herein in its entirety by reference. In brief, the image-processing unit 4 contains a prestored conversion table in which the pixel arrangement for the relationship between the input multiple direct images and the output bird's-eye view images is recorded. When the multiple direct images are input from the pickup unit 1, the image-processing unit 4 stores the various direct images in a specified input memory. These stored direct images are read in units of pixels according to the conversion table by the processing unit 4 and are stored in an output memory. In this way, in the output memory, from the front direct images, the rear direct images, the right side direct images and the left side direct images, the bird's-eye view images can be composed with cutouts of their respective necessary image regions. Once the image-processing unit 4 completes the composition of the bird's-eye view image according to the conversion table, it outputs the bird's-eye view image to the control unit 3.

Figure 4:
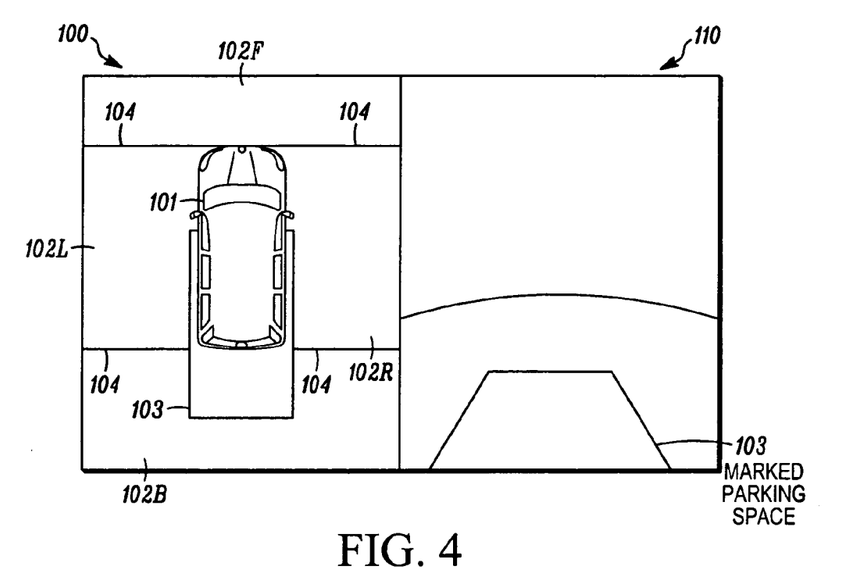
FIG. 4 is a diagram of a display example in which the bird's-eye view image and the direct image appear alongside each other.

The bird's-eye view image 100 of FIG. 4 prepared by the image-processing unit 4 is an image in which the viewing point positions of four types of direct images converge at a single virtual viewing point high above the vehicle. Such a bird's-eye view image 100 allows the driver to view the vehicle surroundings as if the vehicle 10 were being seen from high up in the air.

According to FIG. 4, the bird's-eye view image 100 is constituted by arranging the vehicle computer-generated (CG) image 101 in the center and arranging the left side bird's-eye view image 102L, the right side bird's-eye view image 102R, the front bird's-eye view image 102F and the rear bird's-eye view image 102B, which are subjected to the viewing point conversion, around the vehicle CG image 101. The bird's-eye view image 100 is further constituted by providing a mask line 104 between the front bird's-eye view image 102F and both the left side bird's-eye view image 102L and the right side bird's-eye view image 102R. Another mask line 104 is provided between the rear bird's-eye view image 102B and both the left side bird's-eye view image 102L and the right side bird's-eye view image 102R.

By providing the mask lines 104 to the image seams in this manner, a variety of bird's-eye view images 102 can be divided into multiple regions. The driver can orient himself by the seams. Besides the pattern produced by dividing the bird's-eye view image as shown in FIG. 4, other more finely divided patterns are acceptable, e.g., three or more divisions.

Also shown in FIG. 4, alongside the bird's-eye view image 100, is the direct image 110 of the rear pickup region 11B, which is displayed simultaneously. This direct image 110 can also be that of the front pickup region 11F, the left side pickup region 11L, the right side pickup region 11R or the rear pickup region 11B, according to the shift position information or the vehicle speed signal obtained from the vehicle signal acquisition unit 6.

If the obstacle-detection information from the obstacle-detection unit 5 detects that the vehicle 10 is approaching an obstacle, the control unit 3 carries out the appropriate control measures for notifying the driver with an image or sound or the like, so that attention of the driver can be drawn, or directed, toward information used to check the positional relationship. Furthermore, the control unit 3 acquires the current state of the vehicle from the vehicle speed signal from the vehicle signal acquisition unit 6 or the shift position information from the operating unit 7. A variety of information can be provided to the driver by means of an image, sound or the like depending on given conditions.

Specifically, if it is detected that an obstacle is present in the vehicle surroundings from the obstacle-detection information, the control section 3 simultaneously displays the bird's-eye view image 100, and the direct image 110 that includes the obstacle. Furthermore, the control unit 3 displays the direct image with the direction in which the obstacle has been detected as the pickup region from the vehicle speed signal or the shift position information.

Display examples with the driving support device described above in which the bird's-eye view image 100 and the direct images 110 are simultaneously displayed will be explained below.

Figure 5:
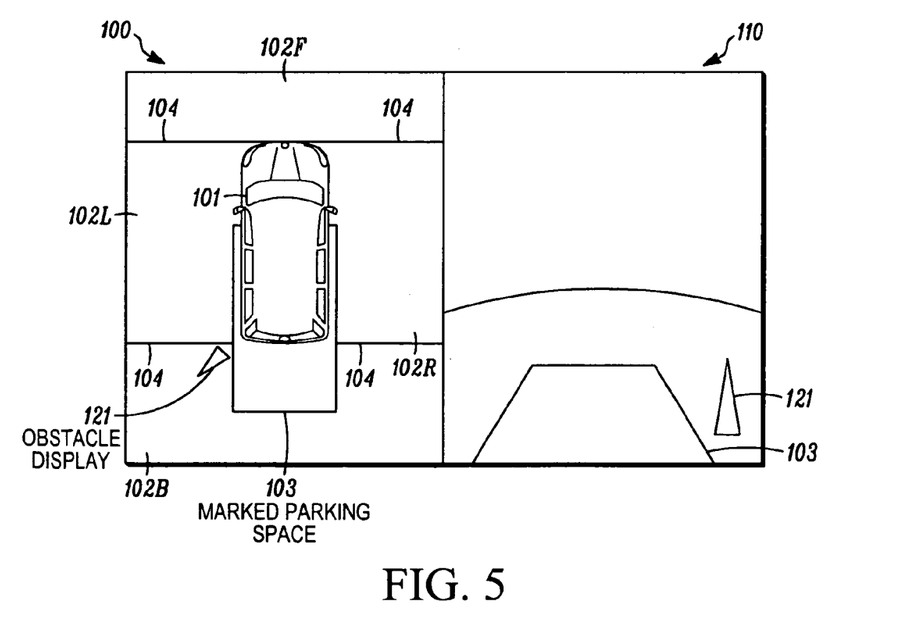
FIG. 5 is a diagram of a display example in which a bird's-eye view image that includes an obstacle display and a direct image appear alongside each other.

In the first example, if there is an obstacle 121 like a pylon near the left rear side of the vehicle 10, as shown in the first display example of FIG. 5, the control unit 3 controls the display unit 2 to display the image obtained by combining the bird's-eye view image 100 prepared by the image-processing unit 4 and the rear direct image 110 picked up with the rear camera 1B. Here, the control unit 3 controls the displays to display the bird's-eye view image 100 and the rear direct image 110 from the vehicle speed data obtained by the vehicle signal acquisition unit 6 and the shift position information from the operating unit 7, irrespective of the obstacle-detection information is contained in the obstacle-detection unit 5.

In this situation, in the bird's-eye view image 100 and the rear direct image 110, the marked parking space display 103 appears in the left side bird's-eye view image 102L, the right side bird's-eye view image 102R, and the rear bird's-eye view image 102B. In the left rear side of the vehicle CG image 101, the obstacle display 121 is displayed in the display position in agreement with its relative position to the vehicle 10 as transmitted according to the obstacle-detection information.

In the case of the display of the bird's-eye view image 100 and the direct image 110 that includes the rear of the vehicle in this manner, the ways in which the obstacle appears in the bird's-eye view image 100 and in the direct image 110 differ.

This is due to the fact that, in the bird's-eye view image 100, the image picked up by the pickup unit 1 has been subjected to the processing required for conversion to the bird's-eye view image 100. The reference plane reappears in the bird's-eye view image 100 with the correct relative position. However, obstacles located above or below the reference plane do not reappear with the correct relative position.

Although not shown in the diagram, since the pylon in the bird's-eye view image 100 in FIG. 5 is a spatial body, it reappears with a distorted shape. Specifically, the front tip portion of the pylon reappears in the bird's-eye view image 100 farther away than its actual position relative to the vehicle 10. Since objects close to the camera of the pickup unit 1 mounted on the vehicle appear farther away, the bumpers of the SUVs and other vehicles with high bumpers will appear farther away in the bird's-eye view image 100 than their actual locations. In this way, there will be an error in the relative position of the driver's vehicle to the actual position of another vehicle.

Therefore, the driving support device as shown in FIG. 5 displays the rear view of the rear side of the vehicle in the direct image 110. In this way, the driving support device displays the obstacle display 121 closer to its actual position by exploiting the fact that the direct image 110 has less distortion with respect to a spatial body than the bird's-eye view image 100 and appears more natural.

Figure 6:
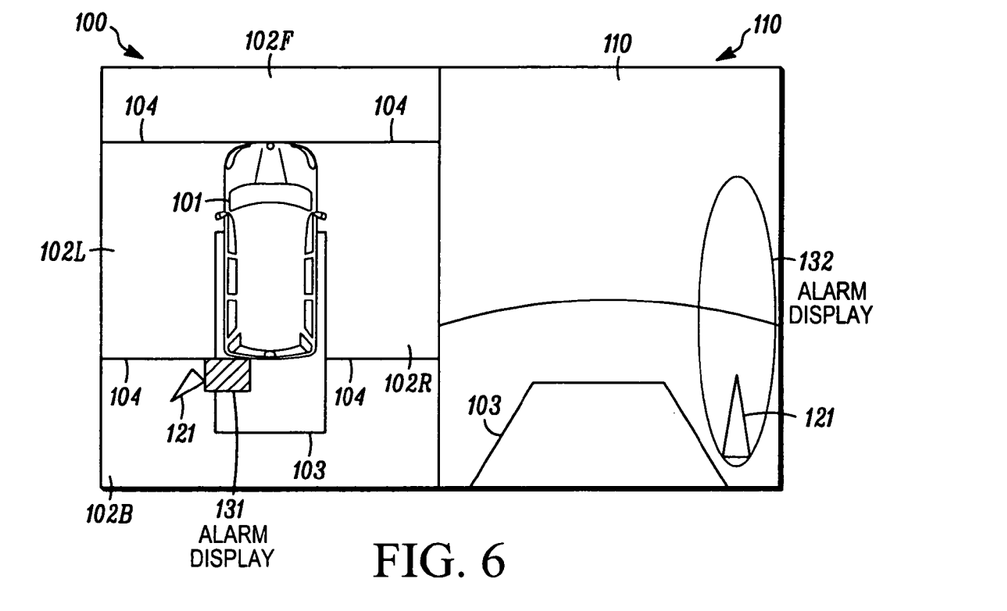
FIG. 6 is a diagram of a display example in which a bird's-eye view image that includes an obstacle alarm display and a direct image appear alongside each other.

Furthermore, in the case in which the relative position of the vehicle 10 and the pylon is acquired by control unit 3 as obstacle-detection information from the obstacle-detection unit 5, the relative position of the pylon to the vehicle 10 is recognized, and the pylon acknowledged as an obstacle. In this case, as shown in FIG. 6, in the bird's-eye view image 100, the control unit 3 displays the obstacle alarm display 131 that may conceal the vicinity of the portion of the vehicle 10 in the direction of the detection of the obstacle. The obstacle alarm display 131, displayed in FIG. 6 with a rectangular shape and color, is highlighted. Since the perceived distance between the vehicle 10 and the obstacle (the pylon) is distorted by the bird's-eye view conversion, there is the possibility of an error when the positional relationship is checked.

The shape of the obstacle alarm display 131 can be round, L-shaped, or a variety of other shapes. Furthermore, the size of the obstacle alarm display 131 can also be changed corresponding to the distance of the vehicle 10 from the obstacle. The display can also flash corresponding to the distance of the vehicle 10 from the obstacle.

The direct image 110 alongside the bird's-eye view image 100, as shown in FIG. 6, displays the obstacle alarm display 132 so that the obstacle display 121 is included. This obstacle alarm display 132 is displayed in an ellipse so that the obstacle display 121 is emphasized. The obstacle alarm display 132 may also surround the obstacle display 121 with a square, triangle, etc. It may also be displayed by emphasizing the obstacle display 121 of the direct image 110 with an icon or the like. Furthermore, it is also acceptable to flash or change the highlighting color of the obstacle alarm display 132 so that the eye is directed to the direct image 110 rather than to the bird's-eye view image 100. In this way, the driver can assess the proximity of the vehicle 10 to the obstacle by referring to the direct image 110 rather than the bird's-eye view image 100 and errors in judgment due to the distortion of the spatial body in the bird's-eye view image 100 can thereby be inhibited.

In this example, the bird's-eye view image 100 and the direct image 110 are displayed in parallel. However, it is also acceptable for the bird's-eye view image 100 and the direct image 110 to be displayed separately; if the displayed image is the bird's-eye view image 100, the obstacle alarm display 131 is displayed together with the bird's-eye view image 100; and if the displayed image is the direct image 110, the obstacle alarm display 132 is displayed together with the bird's-eye view image 100.

Furthermore, in addition to those shapes of the obstacle alarm displays 131 and 132 described previously, it is also for that the type of obstacle to be subjected to image-recognition by the image-processing unit 4 via the direct image captured with the pickup unit 1 and for the virtual display to be carried out corresponding to the type of obstacle. For example, from the results of the image recognition, an icon simulating the shape of people, animals, other vehicles or the like prepared beforehand is displayed as the obstacle alarm display 131 or 132. Or the approximate shape of the obstacle is detected by image recognition and combined with a basic pattern (a square, triangle, circle, etc.), simplified beforehand for synthesis and displayed.

Furthermore, inside the bird's-eye view image 100 and with the shape of the obstacle alarm as a square, it is also acceptable that the direct image 110 be displayed on the concealed portion inside.

The shape or the color of the obstacle is optionally subjected to image recognition by image-processing unit 4 from the direct image picked up with the pickup unit 1, and a virtual display corresponding to the shape or the color of the obstacle is carried out. For example, if a person is detected from the results of image recognition, a rectangle representing the form of the person and a virtual pattern representing clothes are displayed as the obstacle alarm display 131 or 132. Or, in the case of a block or some other small object, a square representing the small object and a graphic pattern representing the surface can also be displayed as the obstacle alarm display 131 or 132.

For the obstacle alarm display 131 or 132, the portion of the vehicle 10 for which an erroneous recognition of the positional relationship of the vehicle 10 to the obstacle is anticipated should not to be completely concealed. It is acceptable that it be surrounded by a frame or colored with yellow, red or some other translucent highlighting color. In this way, by the utilization of the image in the bird's-eye view image 100 with little or no concealment, the driver can be warned.

Figure 7:
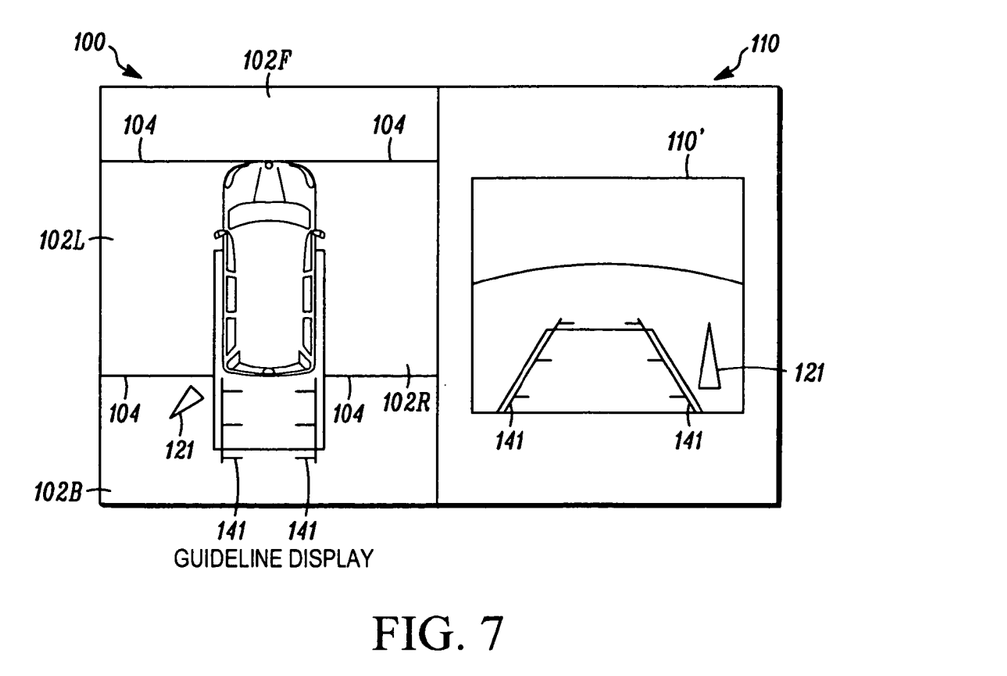
FIG. 7 is a diagram of a display example in which a bird's-eye view image that includes a guideline display and a direct image appear alongside each other.

Next, the second display example of the bird's-eye view image 100 and the direct image 110 will be explained. In this second display example, before the obstacle is detected around the vehicle 10 from the obstacle-detection information, as shown in FIG. 7, the display size of the direct image 110' is made smaller than the display size of the bird's-eye view image 100. In this way, during the period in which no obstacle is detected, attention is directed to the bird's-eye view image 100 rather than to the direct image 110.

Furthermore, in the second display example in the bird's-eye view image 100 and the direct image 110', a guideline display 141 is displayed to make the positional relationship of the vehicle 10 to the vehicle surroundings. This guideline display 141 can comprise lines indicating the vehicle width that extend from the vehicle CG image 101 in the direction of travel. It can also comprise anticipated path-of-travel lines that change according to the steering angle detected by the vehicle signal acquisition unit 6. Moreover, in this second display example, either the guideline display 141 in the bird's-eye view image 100 or the guideline display 141 in the direct image 110' may be displayed, or both may be displayed simultaneously.

Figures 8, 9:
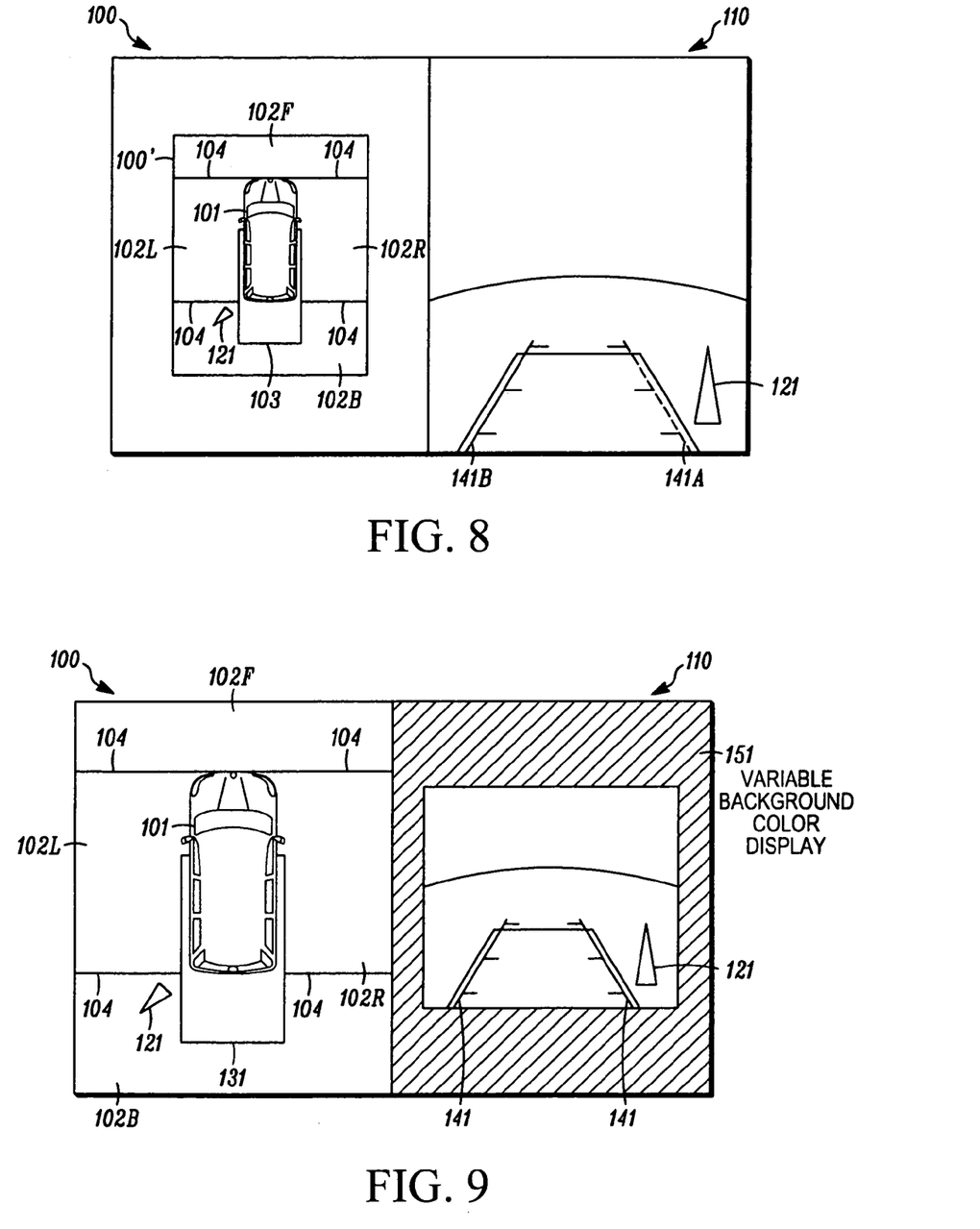
FIG. 8 is a diagram of a display example in which a bird's-eye view image that includes a guideline display with a change in the display state and a direct image appear alongside each other.
FIG. 9 is a diagram of a display example in which a bird's-eye view image with a change in the background color and a direct image appear alongside each other.

During the display of the bird's-eye view image 100 and the direct image 110' in this way, if an obstacle is detected from the obstacle-detection information, the display sizes of the bird's-eye view image 100' and of the direct image 110 can be respectively decreased and increased from the display state shown in FIG. 7 to that shown in FIG. 8 by the control unit 3. In this way, the display size of the bird's-eye view image 100' is made smaller than that of the direct image 110, so that during obstacle-detection, attention will be directed to the direct image 110 rather than to the bird's-eye view image 100'.

In this example, as indicated by the dotted line inside the direct image 110 of FIG. 8, the guideline display 141B farthest from the obstacle is not flashed, and the guideline display 141A on the obstacle-detection side is flashed. In this way, the position at which the obstacle appears in the direct image 110 can be made known to the driver. Furthermore, without being restricted to the case of flashing the guideline display 141A, in comparison to the guideline display 141B on the obstacle non-detection side, it is also acceptable if the guideline display 141A on the obstacle-detection side is highlighted by color or by boldface. Furthermore, it may be represented by animation, having a motion like the flow of the guideline display 141A so that the eye of the driver is drawn toward it. Moreover, even in the case in which the guideline display 141 is displayed as the anticipated travel path according to the steering angle detected by the vehicle signal acquisition unit 6, in the same manner, the display state is such that attention is drawn to the guideline display 141A on the obstacle-detection side.

By erasing the guideline display 141A displayed in the bird's-eye view image 100 when no obstacle is detected at the time that an obstacle is detected, the control unit 3 can avoid mistakes in the judgment of the positional relationship with respect to a spatial object.

In the explanation of the second display example during the detection of an obstacle using FIG. 7 and FIG. 8 described above, the simultaneous decrease of the display size of the bird's-eye view image 100 and increase of the display size of the direct image 110, flashing the obstacle side of the guideline display 141A in the direct image 110 and so on has been shown. However, as long as the attention of the driver can be directed, the change in the display size and the change in the display state of the guideline display 141A may also be done separately. It is also acceptable if the guideline display 141A of the bird's-eye view image 100 during obstacle-detection is flashed without being erased.

Next, the third display example of the bird's-eye view image 100 and the direct image 110 will be explained. In this third display example, before an obstacle is detected around the vehicle 10 from the obstacle-detection information in the same manner as in FIG. 7, the display size of the direct image 110 is made smaller than the display size of the bird's-eye view image 100. During obstacle-detection, as shown in FIG. 9, by changing the color of the background color variable region 151 as the background of the direct image 110' without changing the display size of the direct image 110, the attention and eye of the driver is directed. In this way, by emphasizing the background color of the variable background color region 151, the attention of the driver can be directed in a more reliable manner.

Furthermore, in the first, second and third display examples described above, the detection of an obstacle has been made known to the driver by changing the display contents of the display unit 2. However, it is possible that, at the same time that the display contents are changed, the driver can be urged to look at the direct image 110 by means of a voice or sound.

As explained in detail above, with the driving support device using the present invention, when an obstacle is detected, the bird's-eye view image 100 and the direct image 110 picked up in the direction of the obstacle detected with respect to the vehicle are displayed simultaneously. Even in the case of the display of the bird's-eye view image 100, the difference between the relative position of the obstacle in the bird's-eye view image 100 and the relative position of the actual obstacle can be checked on the same screen.

Figure 10:
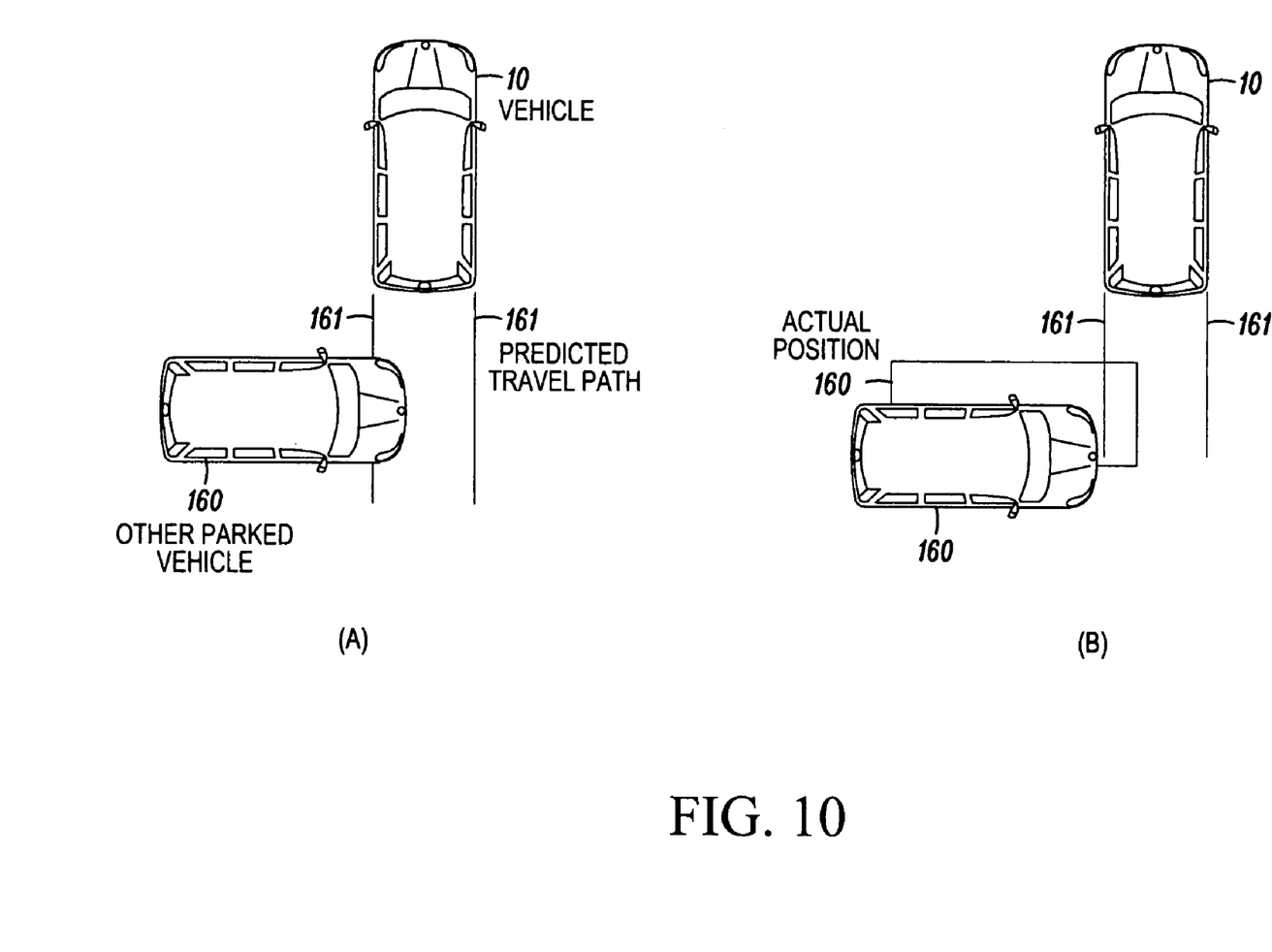
FIG. 10 is a diagram used to explain the effects of embodiments of the driving support device wherein (A) shows the positional relationship of the vehicle and another vehicle, and (B) shows the positional relationship of the vehicle and another vehicle that can be ascertained from the bird's-eye view image.

For example, the positional relationship between the actual vehicle 10 and another vehicle 160 is shown in (A) of FIG. 10. Extending predicted travel path 161 for the straight backing-up of the vehicle 10 shows the possibility that the other vehicle 160 is in the anticipated travel path 161 of the vehicle 10. However, as shown in (B) of FIG. 10, due to the image distortion during the preparation of the bird's-eye view image 100, the positional relationship between the vehicle 10 and the other vehicle 160 deviates from the actual position 160'. In the case of extending the predicted travel path 161, there is the possibility of an erroneous identification since the other vehicle 160 is not actually in the anticipated travel path 161 of the vehicle 10. In this respect with the driving support device during obstacle-detection, not only the bird's-eye view image 100 but also the direct image 110 can be displayed at the same time. With the direct image 110, a sense of the distance between the vehicle 10 and the actual obstacle can be ascertained.

Furthermore, during the detection of an obstacle, in the bird's-eye view image 100 the obstacle display 121 for emphasizing the portion of the vehicle approaching said obstacle is carried out. Thus, by referring to the bird's-eye view image 100 including the obstacle display 121 the direction of the actual obstacle with respect to the vehicle 10 can be ascertained. As the obstacle display 121 of the bird's-eye view image 100, for the display concealing the portion of the vehicle approaching the obstacle, the approach to the obstacle can be checked with the direct image 110.

With the disclosed driving support device, as the obstacle display 121 of the bird's-eye view image 100, in the portion concealing the portion of the vehicle approaching the obstacle, the direct image 110 picked up in the direction of the obstacle with respect to the vehicle can be displayed. From the display of the obstacle display 121, the obstacle can be perceived by looking at the direct image 110.

Also with this driving support device, in the part that conceals the portion of the vehicle approaching the obstacle in the bird's-eye view image 100, a virtual display that indicates the type of obstacle is presented. Not only can the direction of the obstacle with respect to the vehicle 10 be ascertained, but also the type of obstacle can be ascertained.

In the part that conceals the portion of the vehicle approaching the obstacle in the bird's-eye view image 100, a graphical display that indicates the shape and color of the obstacle can be carried out. Not only can the direction of the obstacle with respect to the vehicle 10 be ascertained, but also the shape and color of the obstacle.

Furthermore, upon detection of an obstacle, the display state of the guideline display 141 for indicating the positional relationship of the vehicle and the vehicle can be changed in the bird's-eye view image 100. The presence of the obstacle can be reliably ascertained by the driver.

During the display of the guideline display 141 for indicating the positional relationship of the vehicle and the vehicle surroundings in the bird's-eye view image 100, if an obstacle is detected the guideline display 141 closest to the obstacle is optionally erased. Thus, the presence of the obstacle can be reliably ascertained by the driver.

Alternatively, or in addition thereto, an obstacle alarm display 131 that emphasizes the portions closest to said obstacle appears in the direct image 110. Thus, presence of the obstacle can be reliably ascertained by the driver.

As the obstacle alarm display 131 in the direct image 110, the part of the display that contains the portion closest to the obstacle can be enclosed with a line. Thus, the presence of the obstacle can be further reliably ascertained by the driver.

Furthermore, upon detection of an obstacle in the direct image 110, the display state of the guideline display 141 for indicating the positional relationship of the vehicle and the vehicle surroundings can be changed. Thus, the presence of the obstacle can be reliably ascertained by the driver.

In the direct image 110, during the actuation of the guideline display 141 for indicating the positional relationship of the vehicle and the vehicle surroundings, in the case of the detection of an obstacle, the part of the guideline display 141 closest to the obstacle can be flashed, while the rest of the guideline display 141 is not. Thus, the presence of the obstacle can be reliably ascertained by the driver.

Also, in the direct image 110, during the actuation of the guideline display 141 for indicating the positional relationship of the vehicle and the vehicle surroundings in the case of the detection of an obstacle, the displayed color of the guideline display closest to the obstacle can be changed. Thus, the presence of the obstacle can be reliably ascertained by the driver.

If an obstacle is not detected, the display size of the bird's-eye view image 100 can be made larger than the display size of the direct image 110 so that the direction of a marked space or the like with respect to the vehicle 10 can be made known from the bird's-eye view image 100. If an obstacle is detected, the display size of the direct image 110 can be made larger rather than the display size of the bird's-eye view image 100 so that the relative position of the obstacle with respect to the vehicle 10 can be made known.

Finally, with this driving support device, if an obstacle is detected the background color of the direct image 110 can be changed. This would reliably draw the eyes to the direct image 110 rather than to the bird's-eye view image 100.

This application is based on Japanese Patent Application No. 2005-166865, filed Jun. 7, 2005, in the Japanese Patent Office, the entire contents of which are hereby incorporated by reference.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An image display device for a vehicle, comprising:
multiple image pickup devices that capture multiple direct images of the vehicle surroundings in different directions;
an image-processing device that composes a bird's-eye view image using the multiple direct images; and
a display device that provides at least one of the bird's-eye view image and a direct image picked up by one of the multiple image pickup devices to the driver; and
wherein the image-processing device displays simultaneously on the display device at least two discrete images, a first of the at least two discrete images including the bird's-eye view image and a second of the at least two discrete images including a direct image picked up by only one of the multiple image pickup devices;

wherein the image-processing device displays the second of the at least two discrete images with a display size larger than a display size of the first of the at least two discrete images; and wherein the image-processing device selects the second discrete image to be displayed in response to at least one of a position of a detected obstacle and a gear change of the vehicle.

2. The image display device according to claim 1 wherein the display device displays an obstacle alarm in the first discrete image to emphasize a portion of the vehicle approaching the obstacle.

3. The image display device according to claim 2 wherein the obstacle alarm is the second discrete image superimposed over a portion of the first discrete image including the vehicle approaching the obstacle in the bird's-eye view image.

4. The image display device according to claim 1, further comprising:

an obstacle detector that detects the obstacle; and at least one guideline indicating a positional relationship of the vehicle to vehicle surroundings, the at least one guideline superimposed on at least one of the first discrete image and the second discrete image and arranged to indicate a direction of travel of the vehicle.

5. The image display device according to claim 4 wherein the at least one guideline has a first display state; and wherein the display device changes the first display state to a second display state of at least a portion of the at least one guideline when the obstacle is detected by the obstacle detector.

6. The image display device according to claim 4 wherein the at least one guideline has a first display state; and wherein the display device erases a portion of the at least one guideline closest to the obstacle when the obstacle is detected by the obstacle detector.

7. The image display device according to claim 4 wherein the display device flashes a portion of the at least one guideline closest to the obstacle when the obstacle is detected by the obstacle detector.

8. The image display device according to claim 4 wherein the display device changes a color of a portion of the at least one guideline closest to the obstacle when the obstacle is detected by the obstacle detector.

9. The image display device according to claim 1 wherein the display device emphasizes a portion of the second discrete image closest the obstacle.

10. The image display device according to claim 9, further comprising:

a line enclosing and emphasizing the portion of the second discrete image closest the obstacle.

11. The image display device according to claim 1, further comprising:

a first background color external of at least one of the first and second discrete images; and wherein the display device changes the first background color to a second background color.

12. An image display device for a vehicle, comprising:

means for capturing vehicle surroundings from a plurality of directions;

means for composing a bird's-eye view image from multiple images of the vehicle surroundings so captured;

means for detecting a presence of any obstacles in the vicinity of the vehicle;

means for simultaneously displaying at least two discrete images to the driver, a first of the at least two discrete images including the bird's-eye view image and a second of the at least two discrete images including a single direct image picked up in a direction of an obstacle in response to detection of the obstacle; and means for sizing the second of the at least two discrete images to have a larger display size than a display size of the first of the at least two discrete images.

13. An image display method for a vehicle, comprising:

capturing vehicle surroundings from a plurality of directions;

composing a bird's-eye view image from multiple images of the vehicle surroundings so captured;

detecting a presence of any obstacles in the vicinity of the vehicle;

simultaneously displaying at least two discrete images to the driver, a first of the at least two discrete images including the bird's-eye view image and a second of the at least two discrete images including a single direct image picked up in a direction of an obstacle in response to detection of the obstacle; and sizing the second of the at least two discrete images to have a larger display size than a display size of the first of the at least two discrete images.

14. The image display method according to claim 13, further comprising:

superimposing guidelines indicating a positional relationship between the vehicle and vehicle surroundings and indicating a direction of travel of the vehicle on at least one of the first and second discrete images.

15. The image display method according to claim 14, further comprising:

changing a display state of the guidelines when the obstacle is detected.

16. The image display method according to claim 15 wherein changing the display state of the guidelines when the obstacle is detected further comprises at least one of erasing a portion of the guidelines closest to the obstacle when the obstacle is detected, flashing the portion of the guidelines closest to the obstacle when the obstacle is detected, and changing the color of a portion of the guidelines closest to the obstacle when the obstacle is detected.

17. The image display method according to claim 13, further comprising:

emphasizing at least a portion of the vehicle approaching the obstacle on at least one of the bird's-eye view image and the direct image.

18. The image display method according to claim 17 wherein emphasizing at least the portion of the vehicle approaching the obstacle further comprises at least one of concealing the portion of the vehicle approaching the obstacle on the first discrete image using the second discrete image, enclosing the portion of the second discrete image closest the obstacle with a line, making an area of a display device occupied by the second discrete image larger than an area of a display device occupied by the first discrete image, and changing a color of a background bordering at least one of the two discrete images.

19. An image display device for a vehicle, comprising:

multiple image pickup devices that capture multiple direct images of the vehicle surroundings in different directions;

an image-processing device that composes a bird's-eye view image using the multiple direct images; and a display device that provides the bird's-eye view image to the driver;

wherein the image-processing device displays simultaneously on the display device at least two discrete images, a first of the at least two discrete images including the bird's-eye view image and a second of the at least two discrete images including a direct image picked up by only one of the multiple direct image pickup devices; and wherein the display size of the second of the at least two discrete images is larger than the display size of the first of the at least two discrete images.

20. The image display device of claim 19 wherein the image-processing device selects the second discrete image as a front image ahead of the vehicle when a shift position of the vehicle is configured to propel the vehicle forward; and wherein the image-processing device selects the second discrete image as a rear image behind the vehicle when a shift position of the vehicle is configured to propel the vehicle rearward.

21. The image display device of claim 19 wherein the image-processing device selects the second discrete image based on the vehicle speed.

* * * * *